United States Patent Office 3,417,264
Patented Dec. 17, 1968

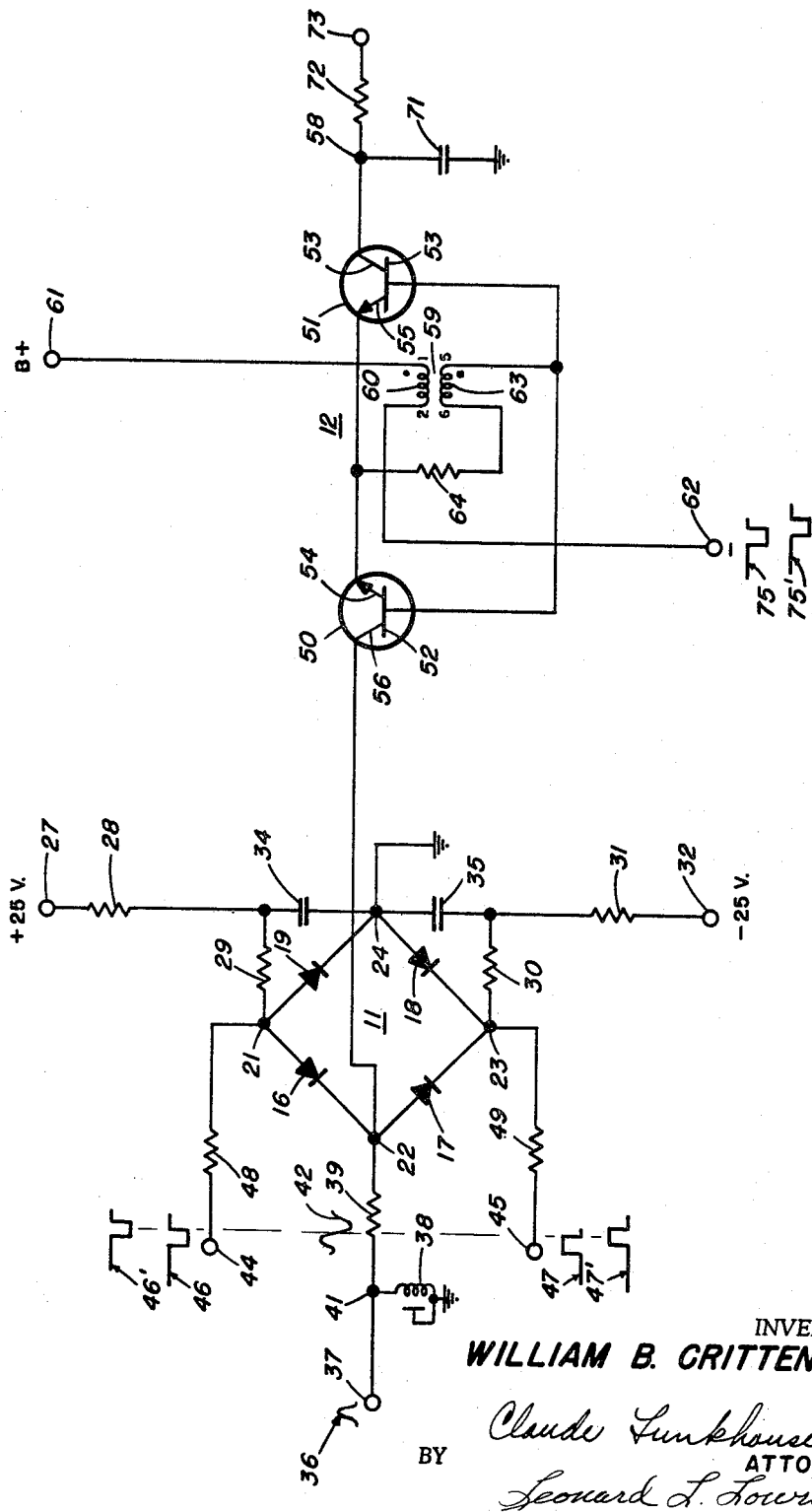

3,417,264
TIME DISCRIMINATOR
William B. Crittenden, Baltimore, Md., assignor, by mesne assignments, to the United States of America as represented by the Secretary of the Navy
Filed Sept. 30, 1965, Ser. No. 492,363
7 Claims. (Cl. 307—232)

ABSTRACT OF THE DISCLOSURE

There is disclosed a time discriminator comprising a diode switch and chopper switch in combination which can be used as either a target or error detector in a pulse tracking radar and which operates with low voltage power to contribute very low drift to the overall tracking loop.

---

The present invention relates to a time discriminator and more in particular a target or error detector for use in a pulse tracking radar.

In prior discriminators used for other pulse tracking radar systems, large amounts of AC and DC power were consumed. Further disadvantages of the prior circuits were the use of tubes and many high voltage resistors large in size in comparison with transistor circuit components. Moreover, the drift of the output current with time made it necessary to rebalance periodically the output current to zero.

An object of the present invention is to provide a time discriminator circuit which is small in physical size and which operates with the low voltage power.

Another object of the present invention is to provide a time discriminator which can be operated by low voltage gate pulses and which will contribute very low drift to the overall tracking loop.

Other objects, advantages and novel features of the invention will become apparent from the following detailed description of the invention when considered in conjunction with the accompanying drawings wherein:

The single figure is an electrical circuit schematic diagram of the present invention.

Referring now to the figure, the time discriminator of the present invention comprises a diode switch 11, in combination with a chopper switch 12. The diode switch or gating circuit 11 comprises four (4) gating diodes 16, 17, 18, 19 arranged in four (4) branches in a bridge configuration, between the four (4) terminal junctions 21, 22, 23 and 24. Each diode is in series and opposing relationship, respectively, with the diode in adjacent branches of the bridge. A 25-volt power supply provides the proper biasing and current for the diodes through resistors 28 and 29 from positive terminal 27 to the junction terminal 21 and from junction terminal 23 through resistors 30 and 31 to the negative terminal 32. Junction terminal 24 is connected to ground potential. Resistor 28 and capacitor 34 are connected in series to ground and resistor 31 and capacitor 35 are likewise connected in series to ground and form decoupling filtering for the plus and minus 25-volt power supply.

In the pulse radar system in which the present invention is used, a received signal or video input signal 36 which represents the intermediate frequency signal corresponding to the reflected signal from the terrain or a target is applied to the input terminal 37. A delay line 38 and resistor 39 are connected between terminal 37 and junction terminal 22 of the diode switch. The delay line 38 is shorted to ground so that the video pulse 36 appearing at the junction terminal 37 is inverted. Since the one-way delay time of the delay line is equal to half of the target or video width, the reflected delay line pulse is a delayed mirror image of the original pulse occurring immediately after it and combining therewith to establish a bipolar video signal 42 or a positive and negative crossover point. The bipolar video signal 42 at terminal 41 is fed through resistor 39 to the junction terminal 22 of diode switch 11.

To the terminals 44 and 45, negative and positive range gates 46 and 47, respectively, are applied from a dual gate generator (not shown) through resistors 48 and 49 to junction terminals 21 and 23, respectively. Resistors 48 and 49 are used to damp critically the pulse transformer used in the dual gate generator. Diodes 16, 17, 18 and 19 are conducting in the absence of any gate pulses on terminals 44 and 45. Resistors 29 and 30 keep the delay line at junction terminal 41 terminated by resistor 39 to ground at terminal 24 as long as the current through resistor 39 is not greater than the current through resistors 29 and 30. The value of resistor 39 is such that the delay line 38 is terminated in its own impedance to prevent unwanted reflections from occurring in the circuit which would indicate the wrong information.

When the negative and positive gates 46 and 47 are applied through resistors 48 and 49 to junction terminals 21 and 23, respectively, the diode switch 11 is turned off by the reverse biasing of the diodes by the gates 46 and 47. At this time any bipolar video pulse 42 on junction terminal 22 will be fed directly to the chopper switch 12.

The chopper switch comprises two (2) transistors 50 and 51, with the bases 52 and 53, and the emitters 54 and 55 connected together. The collector 56 of transistor 52 is connected to junction terminal 22 of the diode switch. The collector 57 of transistor 53 is connected to junction terminal 58. The chopper switch is driven by a one to one pulse transformer 59. The primary 60 of transformer 59 is connected across a power supply from terminal 61 to 62. The secondary 63 is connected from the common bases of transistors 52 and 53 through resistor 64 to junction terminal 65 connected to the common emitters 54 and 55. Transformer 59 has pins designated as 1 and 2 for primary 60 and pins 5 and 6 for the secondary 63. To junction terminal 58 capacitor 71 is connected to ground and summing resistor 72 is connected to output terminal 73.

To the negative terminal 62 of the power supply for the chopper switch a negative gate pulse 75 coincident with gate pulses 46 and 47 is applied. Since pin 1 of primary 60 of transformer 59 is tied to B+, the voltage at this point does not vary on the application of negative pulse 75. Likewise, the voltage at pin 5 of secondary 60 of transformer 59 does not vary either. However, the application of the negative gate pulse 75 will drive the voltage at pin 2 more negative and consequently the voltage at pin 6 will be more negative which will place the proper forward bias between emitters 54 and 55 and the bases 52 and 53 for the conduction of transistors 50 and 51. When the gate pulse 75 ends, the back voltage across the pulse transformer 59 will be a positive pulse which will sharply turn off the transistors of the chopper switch. The purpose of resistor 64 in the circuit is to limit the amount of base current upon the operation of coincidence gate pulse 75. Resistor 64 reduces the initial offset current out of the chopper switch caused by the winding to winding capacity of the pulse transformer.

The time discriminator operates only when the range gating pulses 46 and 47 are applied to the diode switch to turn it off and when a time coincident gate pulse 75 is applied to chopper switch to turn it on. At this time any bipolar video 42 applied to terminal 22 of the diode switch will be transferred through the chopper switch to charge the capacitor 71. When the gating pulses have passed, then the capacitor 71 will discharge through the summing resistor 72 to output terminal 73.

The time discriminator of the present invention can be used for either a target detector or a range error detector depending upon whether the range gate signals 46 and 47 are coincident with the video pulse 36 received at terminal 37 or have been delayed a half of a pulse width from the video pulse.

When the time discriminator operates as a target detector, the range gates 46 and 47 are coincident in time with the video pulse 36, the diode switch 11 will be turned off and the video pulse 36 or the positive portion of the bipolar signal 42 is transferred to the chopper switch 12. Since the negative gate pulse 75 is coincident with gates 46 and 47, the chopper switch 12 will operate and transfer the signal to charge the capacitor 71. At the end of the period of the gates 46, 47 and 75 if a video pulse has had sufficient amplitude, a positive current will be fed to an amplifier (not shown) which will activate a range lock-on relay to maintain the range gates coincident with target video.

Although only the positive portion of the bipolar video signal is used to detect the presence of a target within the range gates, the time delay line 38 is still used in the circuit to cancel noise. The balanced output of bipolar video makes it possible to use the bipolar video for target detection since the average output current is zero for thermal noise and maximum when tracking gates are on target.

In order to use the time discriminator of the present invention as a range error detector, the range gates for diode switch and gating pulse for the trigger switch are delayed a half of a pulse width of video pulse 36 as shown by 46', 47' and 75'. For no error detection between the range gate and video pulse, the delayed range gates 46' and 47' would have to be centered on the crossover point of the bipolar video signal 42 so that the transfer of the bipolar signal through the chopper switch causes no voltage to be charged across capacitor 71. If the positive portion of the bipolar signal 42 falls within the delayed range gates 46' and 47', then the transferred signal to the chopper switch will be positive and the capacitor 71 will be charged positive indicating that the actual range gate is too early. However, if the negative portion of the bipolar video falls within the delay dual gates 46' and 47', then the negative part of the bipolar signal will be transferred to a chopper gate. Since the pulse 75' is coincident with the delay ranges 46' and 47', the capacitor 71 will be charged to a negative voltage.

The negative voltage on capacitor 71 would indicate that the gate is too late and the range of the range gate is too much. Thus the time discriminator used as an error detector causes either a positive or negative voltage to be developed across capacitor 71 indicating the error of the actual range gates 46 and 47. Upon discharge of capacitor 71 through summing resistor 72 to other circuits (not shown) connected to terminal 73, the actual range gates 46 and 47 used for tracking a target are moved in range or time to null out the error in the delayed range gates 46' and 47'. It is to be noted that the detected error characteristic covers a restricted range interval about the target and is linear only in the center of the aperture or gate about the crossover point of the bipolar video.

The advantages of the present invention are that it takes low DC power, one (1) watt total. The gate pulses to operate the circuit can be as small as six (6) volts. The output drift current from $-55°$ C. to $+100°$ C. can be held to less than $10^{-8}$ amperes with a duty cycle of $5 \times 10^{-4}$. Moreover, the low offset current, with no signal in, makes it possible to eliminate any periodical rebalance of the outputs to zero.

Obviously many modifications and variations of the present invention are possible in the light of the above teachings. It is therefore to be understood that within the scope of the appended claims the invention may be practiced otherwise than as specifically described.

What is claimed is:

1. A time discriminator comprising:
   diode switch means;
   chopper switch means connected to said diode switch means;
   coupling means connected to said diode switch means for coupling coincident positive and negative gates for turning off said diode switch means;
   input terminal for receiving a video pulse;
   time delay means connected between said input terminal and said diode switch means, said time delay means for applying an inverted video pulse after reception of said video pulse establishing a bipolar video pulse;
   said diode switch means preventing said time delay means for creating any unwanted pulses of said video pulse when said diode switch means is conducting;
   summing means connected to said chopper switch means;
   means for feeding a coincident third gate to said chopper switch means to operate said chopper switch means during the pulse width period of said third gate when said diode switch is turned off by said positive and negative gates whereby said bipolar video pulse is transferred through said chopper switch to said summing means whereby the output of said summing means represents a bipolar video pulse characteristic occurring within the time of said gates.

2. The time discriminator of claim 1 wherein said diode switch means comprises
   a diode bridge circuit having four (4) branches, each branch with a diode arranged to be in series and opposing relationship, respectively, with adjacent diodes;
   said coupling means connected between each pair of opposing diodes whereby said negative gate prevents two opposing diodes from conducting and said positive gate prevents the other two opposing diodes from conducting allowing said bipolar video pulse to be transferred to said chopper switch.

3. The time discriminator of claim 2 wherein said time delay means comprises a shorted delay line for allowing said video pulse to travel down the line and be reflected back immediately following said video pulse and combining therewith to form a bipolar video pulse whereby any noise received is cancelled out.

4. A time discriminator of claim 3 wherein said chopper means comprises matched transistors with common emitters and based and one collector connected to said diode bridge circuit and the other collector connected to said summing means;
   said feeding means comprises a pulse transformer having a primary and secondary, said primary being connected across a power supply, said secondary being connected from said bases through a limiting resistor to said emitters, said third gate being applied to said primary to induce said gate across said secondary causing conduction of said transistors during said third gate whereby said bipolar video pulse is transferred through said transistors to said summing means, and whereby at termination of said third gate the back voltage across said transformer will sharply turn off said transistors;
   said limiting resistor reducing an initial offset current upon application of said third gate caused by the primary to secondary capacity of said pulse transformer.

5. A time discriminator of claim 1 wherein said chopper means comprises matched transistors with common emitters and bases and one collector connected to said diode switch means and the other collector connected to said summing means;

said feeding means comprises a pulse transformer having a primary and secondary, said primary being connected across a power supply, said secondary being connected from said bases through a limiting resistor to said emitters, said third gate being applied to said primary to induce said gate across said secondary causing conduction of said transistors during said third gate whereby said bipolar video pulse is transferred through said transistors to said summing means and whereby at termination of said third gate the back voltage across said transformer will sharply turn off said transistors;

said limiting resistor reducing an initial offset current upon application of said third gate caused by the primary to secondary capacity of said pulse transformer.

6. The time discriminator of claim 5 wherein said positive and negative gates and said third gate are coincident in time with said video pulse, said output of said summing means being indicative of the presence of said video pulse within said gates for locking the time of said gates when a video pulse is present.

7. The time discriminator of claim 5 wherein said positive and negative gates and said third gates are delayed half of a pulse width of said video pulse whereby said output of said summing means is indicative of either a positive or negative tracking error in time of said video pulse.

References Cited

UNITED STATES PATENTS

| | | | |
|---|---|---|---|
| 3,117,315 | 1/1964 | Engholm et al. | 343—7.3 |
| 3,239,835 | 3/1966 | Crow | 343—7.3 |
| 2,578,256 | 10/1951 | MacNichol | 328—127 |
| 2,975,299 | 2/1961 | Mintzer | 307—293 |
| 3,048,712 | 8/1962 | Alm | 307—232 |

ARTHUR GAUSS, *Primary Examiner.*

H. DIXON, *Assistant Examiner.*

U.S. Cl. X.R.

328—127; 307—240, 246